United States Patent
Muraoka et al.

(10) Patent No.: US 7,595,135 B2
(45) Date of Patent: Sep. 29, 2009

(54) ALKALI STORAGE BATTERY AND METHOD OF PRODUCING THE SAME

(75) Inventors: Yoshiyuki Muraoka, Kadoma (JP); Haruya Nakai, Fujisawa (JP); Masaharu Miyahisa, Fujisawa (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 10/532,043

(22) PCT Filed: Mar. 9, 2004

(86) PCT No.: PCT/JP2004/003043

§ 371 (c)(1),
(2), (4) Date: Apr. 21, 2005

(87) PCT Pub. No.: WO2004/095620

PCT Pub. Date: Nov. 4, 2004

(65) Prior Publication Data

US 2006/0035153 A1    Feb. 16, 2006

(30) Foreign Application Priority Data

Apr. 22, 2003 (JP) ............... 2003-117231
Mar. 3, 2004 (JP) ............... 2004-059520

(51) Int. Cl.
*H01M 2/16* (2006.01)
*H01M 10/04* (2006.01)
*H01M 4/80* (2006.01)

(52) U.S. Cl. ............ 429/246; 429/211; 429/235

(58) Field of Classification Search .......... None
See application file for complete search history.

(56) References Cited

U.S. PATENT DOCUMENTS

2002/0031709 A1 * 3/2002 Ebert .................. 429/246
2005/0008938 A1 * 1/2005 Cho et al. ............. 429/246

FOREIGN PATENT DOCUMENTS

| JP | 50-36935 | | 4/1975 |
| JP | 3-159074 | | 7/1991 |
| JP | 5-190200 | | 7/1993 |
| JP | 5-205769 | | 8/1993 |
| JP | 7-130370 | | 5/1995 |
| JP | 09-171818 | * | 6/1997 |
| JP | 9-171818 | | 6/1997 |
| JP | 2001-176506 | | 6/2001 |
| JP | 2002-15741 | | 1/2002 |

\* cited by examiner

*Primary Examiner*—John S Maples
(74) *Attorney, Agent, or Firm*—McDermott Will & Emery LLP

(57) ABSTRACT

An alkaline storage battery comprising: a positive electrode plate; a negative electrode plate; separators interposed between the positive electrode plate and the negative electrode plate; and an alkaline electrolyte, wherein a first edge of the positive electrode plate and a first edge of the negative electrode plate serve as current collecting portions, at least a second edge of at least the positive electrode plate is covered with polyethylene resin on an end face and peripheral sides thereof, the second edge being positioned opposite to the first edge, and the polyethylene resin film formed at the second edge of the positive electrode plate adheres to the separators positioned on both sides of the positive electrode plate.

9 Claims, 9 Drawing Sheets

F I G. 1
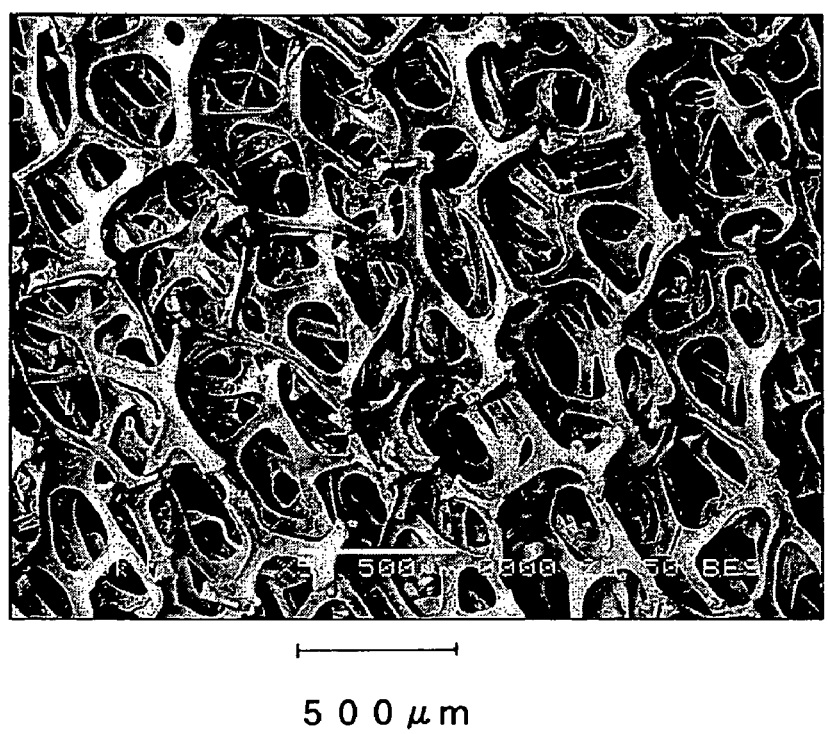
500 μm

ALKALI STORAGE BATTERY AND METHOD OF PRODUCING THE SAME

TECHNICAL FIELD

The present invention primarily relates to a structure of edges of an electrode plate for an alkaline storage battery.

BACKGROUND ART

As a positive electrode plate for an alkaline storage battery, there has conventionally been proposed a positive electrode plate comprising nickel hydroxide particles carried on a foamed nickel substrate having three-dimensionally interconnected pores and a porosity of about 95% as shown in FIG. 1 (see, for example, Japanese Laid-Open Patent Publication No. Sho 50-36935 (Patent Document 1)). Currently, a foamed nickel substrate is widely used as a core material for positive electrode plate in high-capacity alkaline storage batteries. When a battery containing such positive electrode plate is repeatedly charged and discharged, however, the positive electrode plate expands in the thickness and width directions. This is caused by expansion of the volume of the nickel hydroxide contained in the positive electrode plate. When a positive electrode active material extended in the width direction separates therefrom, there arises a problem that the separated active material comes in contact with a negative electrode plate positioned opposite to the positive electrode plate. Likewise, in the negative electrode plate, problems may occur such as separation of the active material and the separated active material coming in contact with the positive electrode plate positioned opposite to the negative electrode plate.

There is recently proposed a core material having a two-dimensional structure such as a punched metal sheet or expanded metal sheet. Core materials having a two-dimensional structure are usually inexpensive because they are produced by a mechanical punching method. The use of the two-dimensionally structured core material can produce a positive electrode plate with a higher capacity. Alternatively, the use of a core material comprising an electrolytic foil can produce a thinner electrode plate. The two-dimensionally structured core materials, however, have the drawback that they have poor function to hold an active material. In view of the above, there is proposed to process the two-dimensionally structured core material into a three-dimensionally structured one (see, for example, Japanese Laid-Open Patent Publications No. Hei 7-130370 (Patent Document 2) and No. 2002-15741 (Patent Document 3)).

FIG. 2 shows a perspective view of a three-dimensionally processed core material. FIG. 3 shows an enlarged view of a part of FIG. 2. This core material 1 comprises a metal sheet 3 having slits formed in a matrix arrangement. Each strip between a pair of the slits forms a first curved protrusion 4 or a second curved protrusion 7. The first curved protrusions 4 and the second curved protrusions 7 protrude alternately above and below the metal sheet 3 along a direction indicated by X. The first curved protrusions 4 and the second curved protrusions 7 are arranged parallel to each other to form a protrusion row 8 along the direction X. A plurality of protrusion rows 8 are arranged along the other direction Y, which is perpendicular to the direction X, with a flat part 9 having a given width between each protrusion row 8. The direction Y is in the longitudinal direction of the core material 1, and the direction X is in the width direction of the core material 1. A plain part 5 where the curved protrusions 4 and 7 are not formed is left on each of the edges that are along the longitudinal direction of the core material 1. On the plain part 5 are formed a plurality of groove-shaped recesses 15 in an undulatory pattern such that the plurality of groove-shaped recesses 15 are parallel to each other.

Even when an active material is carried on the core material as shown in FIGS. 2 and 3, however, the retention of the active material is not satisfactory. As such, if the volume of the nickel hydroxide contained in the positive electrode plate expands due to repetition of charge and discharge, the positive electrode plate will expand in the thickness and width directions. Accordingly, a problem similar to the one encountered in the case of using a foamed nickel substrate arises.

Meanwhile, in order to prevent short-circuiting caused when the burrs of a core material pierce a separator, there is proposed to cover the edges of an electrode plate with a resin. Each edge includes an end face and peripheral sides of the end face. (see, for example, Japanese Laid-Open Patent Publication No. Hei 5-190200 (Patent Document 4)). This proposal is not intended to prevent an active material from separating. Accordingly, it has almost no effect of preventing an active material from separating from the end faces covered with a resin.

DISCLOSURE OF INVENTION

It is difficult to overcome the problem of separation of the active material extended in the width direction of an electrode plate or the problem of short-circuiting between a separated active material and the other electrode plate positioned opposite thereto just by covering the edges, each of which includes an end face and peripheral sides of the end face, of an electrode plate with a resin. This is because the resin extends in the width direction of the electrode plate along with the active material extended by expansion of the active material during repetition of charge and discharge.

It can also be conceived to form, on the edges of an electrode plate, an exposed portion of electrode core material not having an active material layer thereon and then to attach a porous metal layer onto the exposed portion, whereby to prevent the separation of the active material. When such porous metal layer is placed opposite to a counter electrode plate with a separator interposed therebetween, however, an electric current will be focused on the porous metal layer, and the repetition of charge and discharge cycles will promote deterioration of the part of the separator contacting the porous metal layer.

The present invention relates to an alkaline storage battery comprising a positive electrode plate, a negative electrode plate, separators interposed between the positive electrode plate and the negative electrode plate, and an alkaline electrolyte, wherein a first edge of the positive electrode plate and a first edge of the negative electrode plate serve as current collecting portions, at least a second edge of at least the positive electrode is covered with polyethylene resin on an end face and peripheral sides thereof, the second edge being positioned opposite to the first edge, and the polyethylene resin forming a film on the second edge of the positive electrode plate adheres to the separators positioned on both sides of the positive electrode plate.

In the structure described above, the end face and peripheral sides of the end face of the electrode plate are completely covered with polyethylene resin, which is an insulating material. Furthermore, since the polyethylene resin adheres to the separators, it is possible to prevent the extending of the polyethylene resin with the active material in the width direction of the electrode plate.

As for the negative electrode plate, for the purpose of overcoming the drawbacks of a negative electrode such as separation of the active material and the separated active material coming in contact with the positive electrode plate positioned opposite to the negative electrode plate, the second edge of the negative electrode plate is preferably covered with polyethylene resin on an end face and peripheral sides thereof.

The polyethylene resin preferably has a melting point of not greater than 120° C. When the polyethylene resin has a melting point of 120° C. or lower, the edge of the electrode plate can be covered with the polyethylene resin without any damage to the active material.

The polyethylene resin film preferably has a thickness of 5 to 50 μm on the end face of the second edge (i.e. in the direction vertical to the end face of the electrode plate).

The positive and negative electrode plates typically comprise an electrode core material and an active material layer carried on the electrode core material. As such, at least the second edge of at least one of the positive and negative electrode plates covered with the polyethylene resin may comprise an exposed portion of electrode core material not having the active material layer thereon. Preferably, a porous metal layer is attached to the exposed portion of electrode core material. In the structure like this, the porous metal layer has the effect of preventing the separation of the active material.

The thickness of the second edge including the exposed portion of the electrode core material and the porous metal layer is preferably 50 to 100% of that of the electrode plate comprising the electrode core material and the active material layer.

In at least one of the positive and negative electrode plates, the current collecting portion preferably comprises an exposed portion of the electrode core material not having the active material layer thereon. In this case, at least the border area between the current collecting portion and the active material layer is preferably covered with the polyethylene resin.

A porous metal layer may be attached to the exposed portion of electrode core material of the current collecting portion. A part of the porous metal layer is preferably covered with the edge of the active material layer adjacent to the exposed portion. In the structure like this, the electric current that flows into the porous metal layer will be interrupted by the polyethylene resin, which is an insulating material. Accordingly, it is possible to prevent an electric current from focusing on the porous metal layer and the degradation of the part of the separator contacting the porous metal layer.

As the electrode core material, a metal foil or metal sheet subjected to a lath process or punching process is preferably used. For example, in the metal foil or metal sheet, slits are formed in a matrix arrangement, and strips, each of which is positioned between a pair of the slits, are alternately protruded above and below the plane along one direction to form first and second curved protrusions.

The present invention further relates to a method for producing an alkaline storage battery comprising a positive electrode plate and a negative electrode plate and separators interposed between the positive and negative electrode plates and an alkaline electrolyte solution.

The method comprises the steps of: (a) producing a positive electrode plate having a current collecting portion at a first edge thereof and a negative electrode plate having a current collecting portion at a first edge thereof; (b) covering at least a second edge of at least the positive electrode plate with polyethylene resin on an end face and peripheral sides thereof, the second edge positioned opposite to the first edge; (c) winding spirally or laminating the positive electrode plate and the negative electrode plate with a separator interposed therebetween to produce an electrode assembly; and (d) heating the second edge having polyethylene resin carried thereon to allow the polyethylene resin film to adhere to the separators disposed on both sides thereof.

The step (b) comprises, for example, a step of applying an aqueous dispersion of polyethylene resin onto the second edge of the electrode plate on an end face and the peripheral sides of the end face.

Preferably, the step of applying an aqueous dispersion of polyethylene resin onto the end face and the peripheral sides of the end face comprises the steps of: continuously supplying the aqueous dispersion of polyethylene resin to the surface of a rotating roller from one direction to form a coating film having a given thickness on the roller surface; shifting the electrode plate disposed perpendicular to the roller surface toward a direction tangent to the roller surface while the end face and the peripheral sides of the end face are in contact with the coating film. During this step, by shifting the electrode plate at a speed synchronized with the rotation speed of the roller, it is possible to form a uniform film on the edge of the electrode plate.

The aqueous dispersion of polyethylene resin preferably comprises methyl cellulose dissolved therein as a thickener and an anti-settling agent for polyethylene resin. Such aqueous dispersion exhibits excellent storage stability over a long period of time and has a viscosity suitable for application.

The step (a) further comprises, for example, the steps of: applying the paste containing a metal powder and a thickener along at least the second edge, which is opposite to the first edge, of an electrode core material; drying and sintering the paste to form a porous metal layer; and allowing the electrode core material to carry an active material layer thereon except at least the first edge and the second edge.

The step (a) may further comprise the steps of: applying the paste along the first edge of the electrode core material; and drying and sintering the paste to form a porous metal layer.

According to the present invention, it is possible to effectively prevent short-circuiting between the positive electrode active material and the negative electrode plate as well as the separation of the active material by an extremely simple and easy method. It is therefore possible to effectively prevent micro-short circuiting likely to occur in a battery after the battery is subjected to repeated charge and discharge cycles. Moreover, according to the present invention, it is possible to prevent an electric current from focusing on the current collecting portion and thus to inhibit the partial degradation of the separator.

BRIEF DESCRIPTION OF DRAWINGS

FIG. 1 is an enlarged image of a relevant part of a foamed nickel substrate.

BEST MODE FOR CARRYING OUT THE INVENTION

Figure 4:
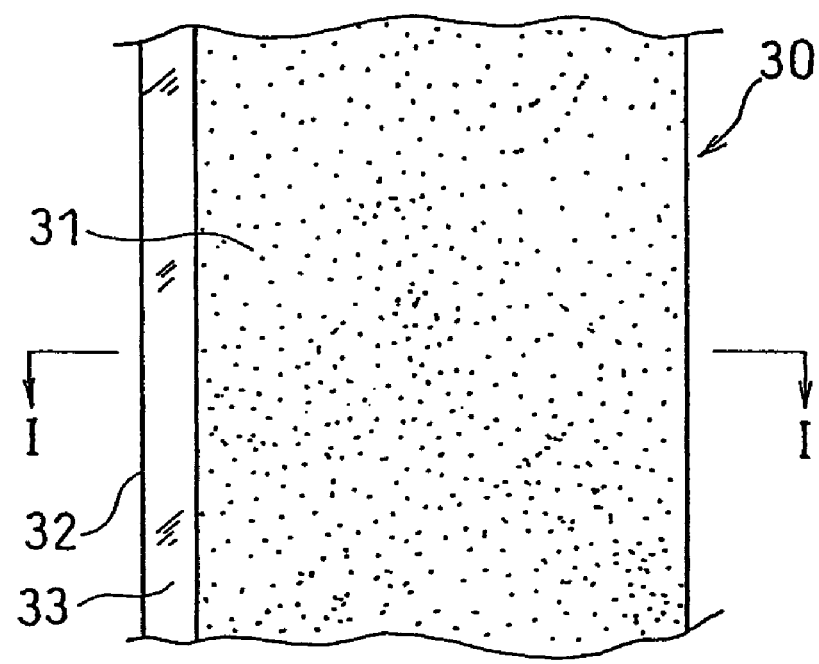
FIG. 4 is a plan view of a positive electrode plate.
Figure 5:
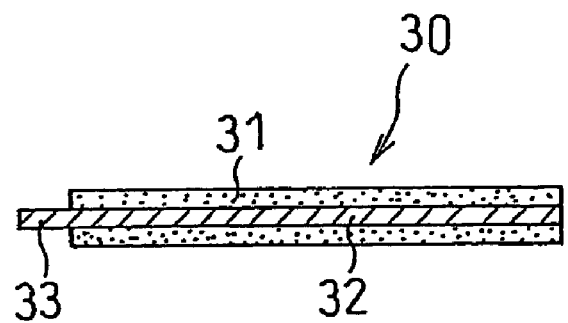
FIG. 5 is a cross-sectional view taken on line I-I of FIG. 4.

An electrode plate for an alkaline storage battery typically comprises an electrode core material and an active material layer carried thereon. FIG. 4 is a plan view of an electrode plate. FIG. 5 is a cross-sectional view taken on line I-I of FIG. 4 showing an electrode plate 30. In FIG. 4, an active material layer 31 is carried on each surface of a flat core material 32 having a two-dimensional structure. It is to be understood that any electrode core material can be used in the present invention. For the positive electrode plate in particular, a three-dimensionally processed (deformed) metal sheet is preferable for use.

Figure 2:
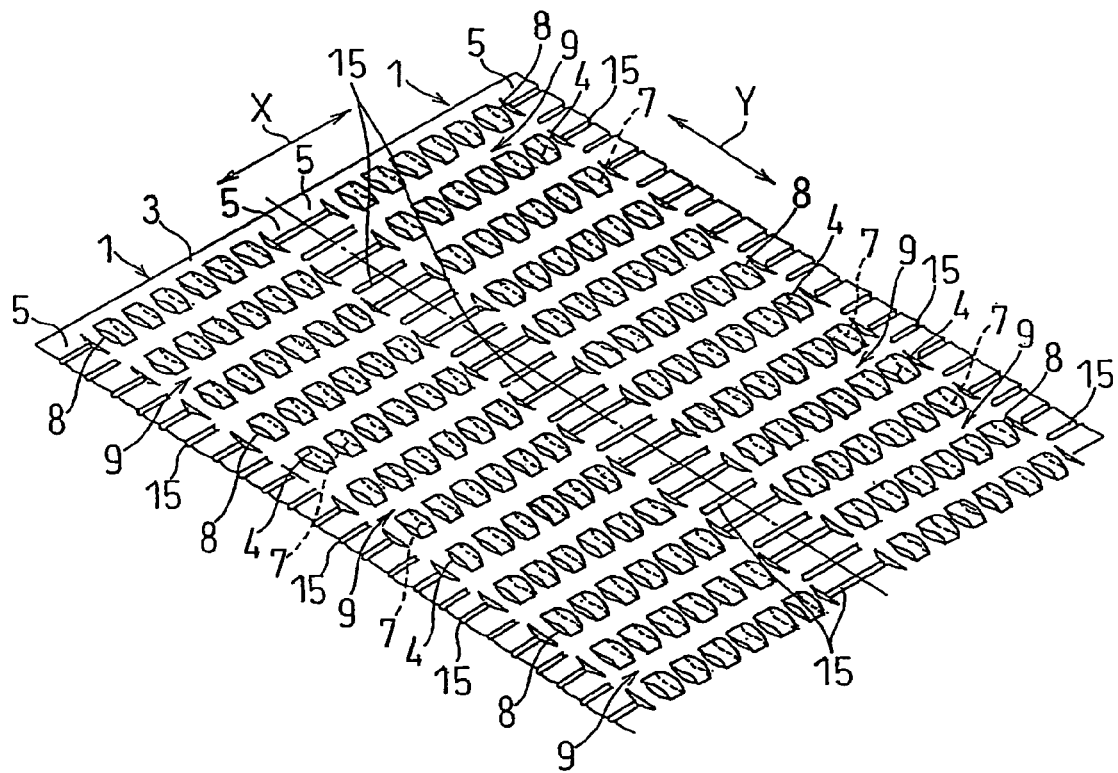
FIG. 2 is a perspective view of a three-dimensionally processed core material.
Figure 3:
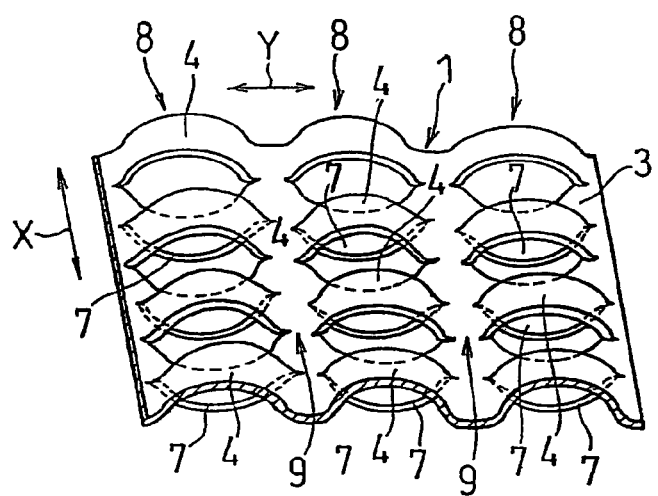
FIG. 3 is an enlarged view of a part of the core material of FIG. 2.

As the three-dimensionally processed (deformed) metal sheet, there can be used, for example, a core material having protrusion rows, each row comprising first curved protrusions and second curved protrusions protruding alternately above and below the core material, as shown in FIGS. 2 and 3 (hereinafter referred to as "core material A"). A core material having burrs protruding alternately above and below the core material produced by punching the core material upward and downward alternately is also preferably used (hereinafter referred to as "core material B"). The metal sheet before the three-dimensional process usually has a thickness of 10 to 80 µm.

A foamed nickel substrate having three-dimensionally interconnected pores and a porosity of about 95% can also be used as the electrode core material. A foamed nickel substrate is typically used as the positive electrode core material for alkaline storage batteries. As the metal sheet to be used for the positive electrode core material, a nickel foil or an iron foil whose surface is plated with nickel is preferably used.

An active material layer is formed by spraying an electrode slurry onto the electrode core material, followed by drying and rolling. To be more specific, as shown in FIG. 4, an active material layer 31 is formed on the surface of a core material 32 except a current collecting portion 33 which is an exposed portion of the core material. The current collecting portion 33 having a given width is formed along one edge parallel to the longitudinal direction of the core material (hereinafter referred to as "first edge"). A sheet comprising the electrode core material and the active material layer thus produced is cut into a desired size to give an electrode plate.

The positive electrode slurry to be used for the preparation of the positive electrode active material layer contains a positive electrode active material comprising mainly nickel hydroxide, a binder, and optionally, a conductive material and a thickener. As the conductive material for the positive electrode, a cobalt compound such as cobalt hydroxide is preferably used.

The negative electrode slurry to be used for the preparation of the negative electrode active material layer contains a specified negative electrode active material, and optionally, a binder, a conductive material, a thickener and the like.

As the positive electrode active material, preferred for use is a solid solution nickel hydroxide powder containing cobalt, zinc and the like.

As the negative electrode active material, a hydrogen storage alloy, a zinc compound, a cadmium compound or the like is used.

As the binder, preferred for use are polytetrafluoroethylene (hereinafter referred to as "PTFE"), a polyethylene derivative, fluororubber and the like.

As the thickener, preferred for use are a water-soluble cellulose derivative, a water-soluble acrylic resin derivative, polyvinyl alcohol derivative and the like.

Figure 6:
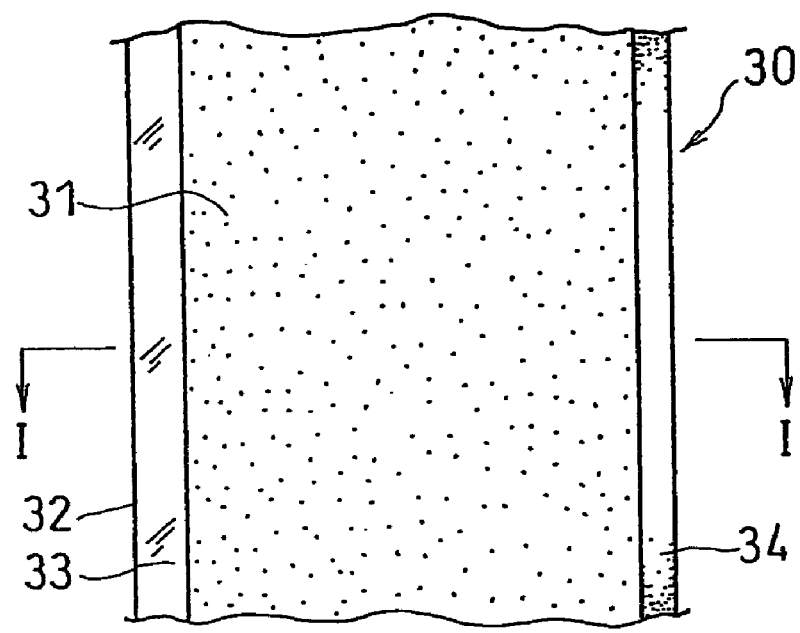
FIG. 6 is a plan view of a positive electrode plate having a polyethylene resin film formed on the second edge thereof.
Figure 7:
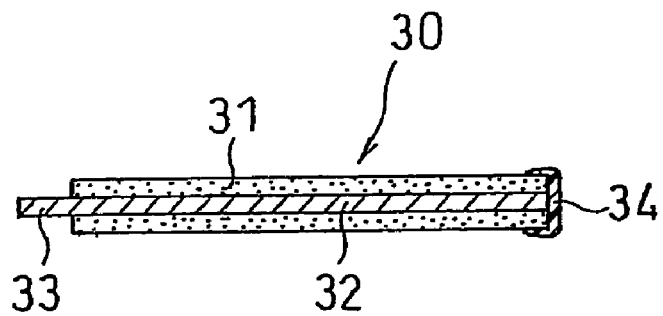
FIG. 7 is a cross-sectional view taken on line I-I of FIG. 6.

Subsequently, at least the second edge, which is positioned opposite to the first edge and includes an end face and peripheral sides thereof, of the obtained electrode plate is covered with polyethylene resin as shown in FIG. 6. FIG. 6 is a plan view of an electrode plate having a polyethylene resin film 34 formed thereon. FIG. 7 is a cross-sectional view taken on line I-I of FIG. 6 showing an electrode plate 30.

The polyethylene resin film is formed by, for example, applying an aqueous dispersion of polyethylene resin to the second edge on an end face and peripheral sides thereof of the electrode plate, followed by heating. Alternatively, melted polyethylene resin obtained by heating may be applied thereto. Such method, however, is unlikely to produce a thin film. Polyethylene resin may be applied to the edge(s) of the electrode plate other than the second edge in the same manner as the second edge.

As the aqueous dispersion of polyethylene resin, any commercially available aqueous dispersion of polyethylene resin can be used. In the case of using a commercially available aqueous dispersion of polyethylene resin having a high solid content (e.g., having a resin content of not less than 60 wt %), it is preferably diluted with water or the like. If an aqueous dispersion having a high solid content is used, it will be difficult to form a polyethylene resin film having a desired thickness.

When the aqueous dispersion is diluted using pure water, polyethylene resin may aggregate and precipitate. In order to prevent this, it is effective to add a water-soluble resin having a thickening effect to dilution water. It should be noted that the use of a water-soluble resin containing an alkaline metal such as carboxymethyl cellulose will be counterproductive because the precipitation of polyethylene resin is further accelerated. Accordingly, it is preferred to use a water-soluble resin not containing an alkaline metal, namely, methyl cellulose, polyvinyl alcohol or the like. Particularly preferred for use is methyl cellulose.

The preferred content of polyethylene resin in the aqueous dispersion of polyethylene resin is 10 to 50 wt %. When the content of polyethylene resin is less than 10 wt %, defects are likely to occur in the polyethylene resin film. Conversely, when the content thereof exceeds 50 wt %, the surface tension of the aqueous dispersion will increase, which makes it difficult to achieve a uniform application of the aqueous dispersion. The content of polyethylene resin can be adjusted according to the intended film thickness.

The content of the water-soluble resin in the aqueous dispersion of polyethylene resin is preferably 2.5 to 5.0 wt %. When the content of the water-soluble resin is too high, after polyethylene resin is formed into a film, the water-soluble resin will be leached out from the film into an electrolyte solution, which reduces the insulation effect that polyethylene resin is expected to offer. On the contrary, when the content of the water-soluble resin is too low, a uniform film is unlikely to be obtained.

The polyethylene resin to be used to cover at least the second edge of the electrode plate preferably has a low density. The polyethylene resin also preferably has a melting point of not greater than 120° C., more preferably not greater than 110° C. When the polyethylene resin has a melting point exceeding 120° C., the active material will be degraded during heating of the edge of the electrode plate to allow the polyethylene resin to adhere to the electrode plate, and thus the utilization rate of the active material will be low.

In a molecule of the polyethylene resin, double bonds remain after the production process thereof. The double bond content in the polyethylene resin is preferably as low as possible. For example, when the polyethylene resin film is formed on the positive electrode plate, polyethylene will be in an oxidation state, and the decomposition of polyethylene resin may proceed starting from the double bonds. As such, a film using polyethylene resin having a high double bond content is likely to degrade during repeated charge and discharge cycles of the battery.

The method for applying the aqueous dispersion of polyethylene resin onto at least the second edge, which includes an end face and peripheral sides thereof, of the electrode plate is not specifically limited. For example, according to the following method, a uniform film can be obtained.

Figure 8:
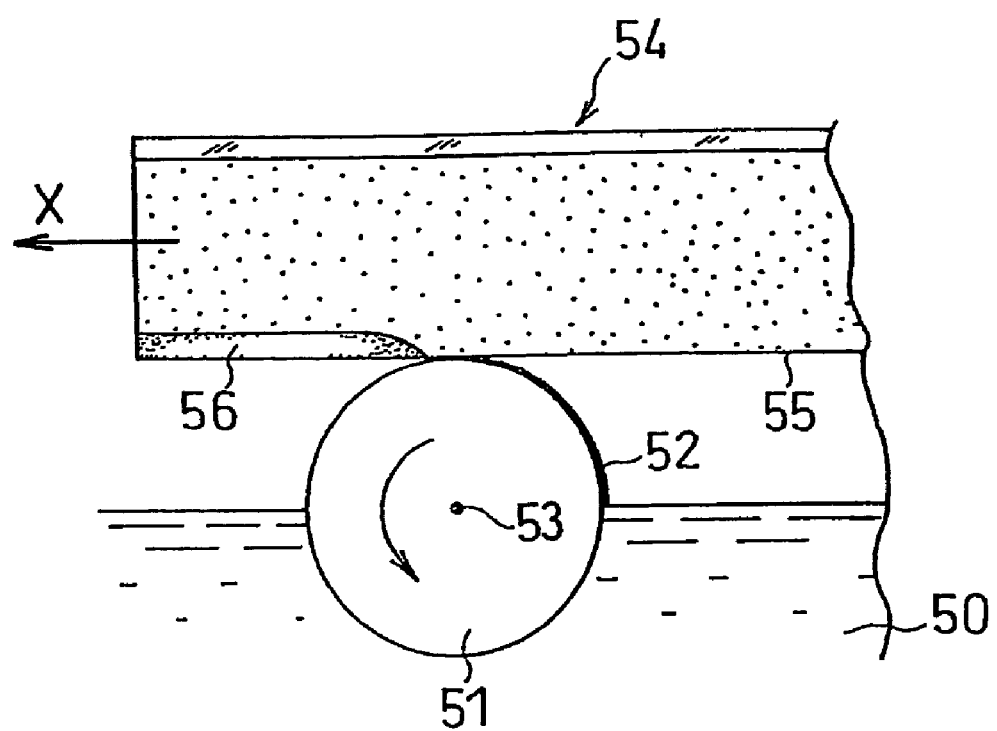
FIG. 8 is a diagram illustrating a method for applying an aqueous dispersion of polyethylene resin onto an edge of an electrode plate.

A description will be given with reference to FIG. 8. It should be understood that FIG. 8 is essentially a schematic diagram so that the size of each element does not correspond to the actual size thereof.

Firstly, an aqueous dispersion of polyethylene resin 50 is continuously supplied from one direction to the surface of a rotating roller 51 to form a coating film 52 having a predetermined thickness on the surface of the roller.

Specifically, the roller 51 is disposed in order that the surface of the aqueous dispersion of polyethylene resin and the cross section of the roller perpendicular to the rotation axis 53 make an intersection line. The roller 51 is then rotated at an arbitrary speed. The rotation axis 53 of the roller should be parallel or almost parallel to the surface of the aqueous dispersion.

When the roller is rotated with such arrangement, the aqueous dispersion is coated, in the form of a film, on the surface of the roller during the passage of the roller surface through the aqueous dispersion. The roller surface to which the aqueous dispersion coating film is attached is moved above the surface according to the rotation. The rotation speed should be appropriately adjusted according to the viscosity of the aqueous dispersion so that an aqueous dispersion coating film having a desired thickness is coated on the surface of the roller.

The roller 51 is preferably disposed such that not less than 50% of the cross section of the roller vertical to the rotation axis 53 is positioned under the surface of the aqueous dispersion. If the ratio of the roller positioned under the surface is less than 50%, the thickness of the aqueous dispersion coating film attached to the surface of the roller will largely fluctuate. Note that if the ratio of the roller positioned under the surface of the aqueous dispersion is 100%, the edge of the electrode plate will be in direct contact with the surface of the aqueous dispersion, which makes it difficult to achieve stable application of the aqueous dispersion onto the edge of the electrode plate.

An electrode plate 54 placed perpendicular to the roller surface is then shifted toward the direction tangent to the roller surface indicated by X while the second edge 55 of the electrode plate 54 is in contact with the aqueous dispersion coating film 52 attached to the roller surface. By this step, it is possible to apply an aqueous dispersion of polyethylene resin 56 onto the second edge 55, which includes an end face and peripheral sides thereof, of the electrode plate 54. The same procedure can be used when applying the aqueous dispersion of polyethylene resin onto the first edge of the electrode plate.

The shifting speed of the electrode plate should be appropriately adjusted according to the viscosity of the aqueous dispersion, the rotation speed of the roller and the like. The shifting direction of the electrode plate may be the same as or opposite to the shifting direction of the roller surface. In order to form a uniform coating film of polyethylene resin on the end face and peripheral sides thereof of the electrode plate, however, it is preferred that the electrode plate be shifted to the same direction as the shifting direction of the roller surface at a speed synchronized with the rotation speed of the roller.

The roller preferably has a diameter of not less than 150 mm. The greater the diameter of the roller is, the more likely the drippings of the aqueous dispersion coating film due to the surface tension will be prevented. Accordingly, it is possible to form a coating film having a uniform thickness on the edge, which includes an end face and peripheral sides thereof, of the electrode plate.

After the aqueous dispersion of polyethylene resin is applied onto at least the second edge of the electrode plate, the temperature of the edge is increased for drying to remove water therefrom to allow the polyethylene resin to adhere to the electrode plate. The temperature at which polyethylene resin is allowed to adhere to the electrode plate is preferably 105 to 120° C.

Figure 9:
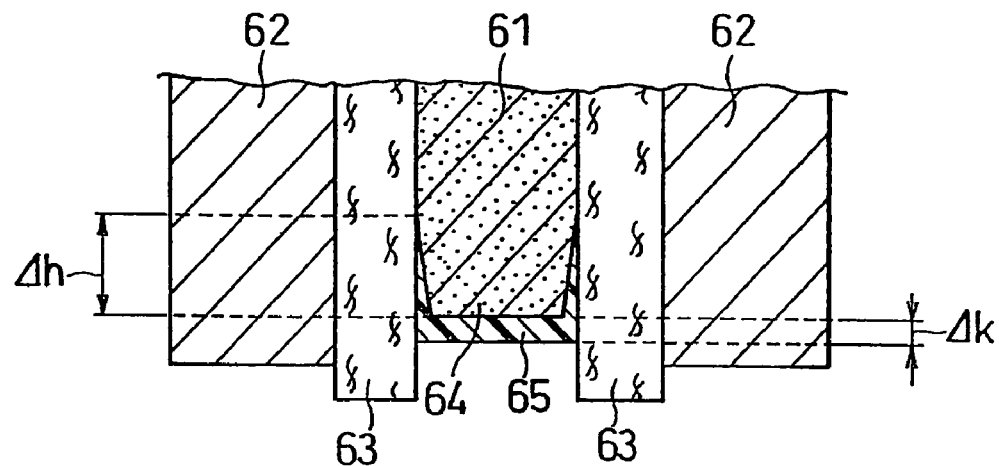
FIG. 9 is a cross-sectional view showing the structure of the vicinity of an edge of a positive electrode plate covered with polyethylene resin in an electrode assembly.

An electrode assembly is then produced by stacking or spirally-winding the positive electrode plate and the negative electrode plate with a separator interposed therebetween. FIG. 9 shows a view showing, in cross section, the structure of the vicinity of the second edge of the positive electrode plate in an electrode assembly. As shown in FIG. 9, between a positive electrode plate 61 and a negative electrode plate 62 is placed a separator 63 having a width wider than that of each of the electrodes. A polyethylene resin film 65 is formed on the end face and the peripheral sides thereof of the second edge 64 of the positive electrode plate 61. The polyethylene resin film 65 is right next to the separators 63 disposed on both sides of the positive electrode plate 61.

The thickness of the polyethylene resin film formed on the end face of the second edge of the electrode plate (i.e. the thickness $\Delta k$ in FIG. 9) is preferably 5 to 50 μm, more preferably 5 to 20 μm. If the thickness $\Delta k$ of the polyethylene resin film is less than 5 μm, the strength of the film becomes reduced, or defects may occur in the film. As a result, the film cannot withstand the swelling of the electrode plate, making it difficult to prevent the short-circuiting between the positive electrode plate and the negative electrode plate. Conversely, the thickness $\Delta k$ of the film exceeding 50 μm may cause displacement during the production of an electrode assembly.

The polyethylene resin film is also formed on each peripheral side of the end face of the second edge of the electrode plate. The height of the polyethylene resin film formed on each peripheral side of the end face of the second edge (i.e. the height Δk in FIG. 9) is preferably 0.3 to 1 mm. If the peripheral sides of the end face are not covered with polyethylene resin, the joining between the separator and the electrode plate by the adhesion of the polyethylene resin film and the separator will be insufficient.

In such electrode assembly, the polyethylene resin film 65 adheres to the separators 63 positioned on both sides of the positive electrode plate 61 by heating the part where the second edge 64 of the positive electrode plate 61 is positioned. The temperature at which the polyethylene resin film 65 is allowed to adhere to the separators 63 is preferably a temperature 5 to 10° C. higher than the melting point of polyethylene resin. When the temperature is less than 5° C. above the melting point, the polyethylene resin film will not adhere to the separators sufficiently. Conversely, when the temperature exceeds 10° C. above the melting point, the polyethylene resin will flow down, making the adhesion of the separators and the polyethylene resin nonuniform.

The whole electrode assembly may be heated so as to allow the polyethylene resin film to adhere to the separators. The heating of the electrode assembly at a very high temperature, however, causes a reduction in utilization rate due to degradation of the active material. The temperature of the electrode assembly is preferably decreased immediately after polyethylene resin is melted. If polyethylene is kept melted for a long period of time, the polyethylene will flow down to make the adhesion of the separators and the polyethylene nonuniform.

The separator is not specifically limited and any well-known separator used for alkaline storage batteries can be used. Examples of the separator include non-woven fabric of polypropylene, non-woven fabric of polyethylene, non-woven fabric made of a composite of polypropylene and polyethylene. Preferably, these separators are subjected to a hydrophilic treatment such as sulfonation.

The first edge, which will serve as the current collecting portion of the positive electrode plate, is exposed in a spirally wound configuration at one end face of the electrode assembly. To the current collecting portion is welded a positive electrode current collector plate. Likewise, the current collecting portion of the negative electrode is exposed in a spirally wound configuration at the other end face of the electrode assembly, to which a negative electrode current collector plate is welded. The electrode assembly thus produced is housed in a case with an electrolyte solution. The opening of the case is sealed with a sealing plate equipped with a safety valve to give an alkaline storage battery.

As the electrolyte solution, an alkaline aqueous solution with potassium hydroxide dissolved therein as the main solute can be used.

A description will now be given of an embodiment wherein the second edge covered with polyethylene resin of at least one of the positive and negative electrode plates comprises an exposed portion of electrode core material not having an active material layer thereon.

Figure 10:
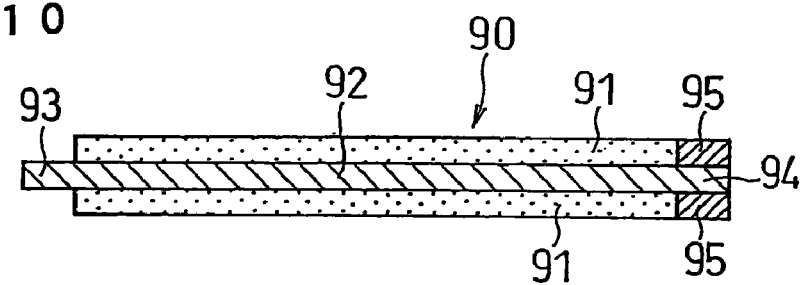
FIG. 10 is a vertical cross-sectional view of a positive electrode plate according to another embodiment.

FIG. 10 is a vertical cross-sectional view of an electrode plate 90 whose second edge comprises an exposed portion of electrode core material not having an active material layer thereon. In FIG. 10, an active material layer 91 is attached to each surface of a flat core material 92 having a two-dimensional structure. In practice, however, the core material is preferably a three-dimensionally processed metal sheet.

At the first edge 93 of the electrode plate 90 is provided a current collecting portion comprising an exposed portion of the core material. Similarly, at the second edge 94 positioned opposite to the first edge is also provided an exposed portion of the core material. To the exposed portion of the second edge 94 is attached a porous metal layer 95. The thickness of the second edge comprising the exposed portion of the electrode core material and the porous metal layer is typically 50 to 100% of that of the electrode plate comprising the electrode core material and the active material layer.

The porous metal layer 95 can be formed by applying a paste containing a metal powder and a thickener along the second edge 94, followed by drying and sintering. When the current collecting portion comprises an exposed portion of core material, a porous metal layer similar to the above may be attached to the exposed portion.

The metal powder preferably has an average primary particle diameter of 0.5 to 4 μm. The primary particles are preferably connected in chain-like fashion to form a three-dimensional structure. The metal powder may be a nickel powder, a stainless steel powder, a chromium powder, a copper powder or the like.

Figure 11:
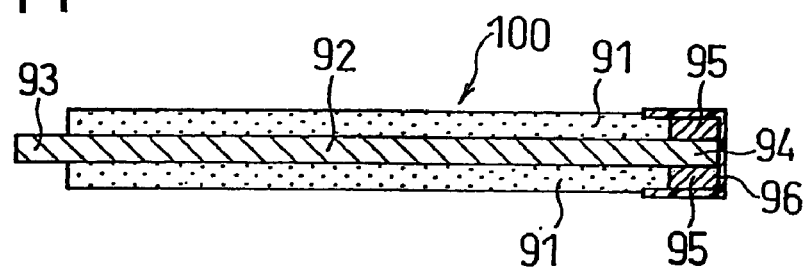
FIG. 11 is a vertical cross-sectional view of a positive electrode plate having a polyethylene resin film formed on the second edge thereof according to another embodiment.

Subsequently, an active material layer is carried on the electrode core material except the first and second edges. A polyethylene resin film 96 is then formed on the end face and the peripheral sides thereof of the second edge 94, as shown in FIG. 11. In an electrode plate 100 thus obtained, the porous metal layer has the effect of preventing the separation of the active material.

Figure 12:
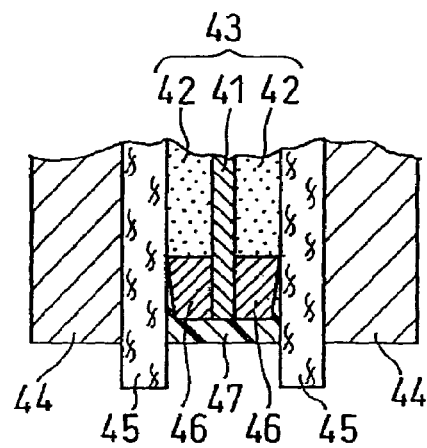
FIG. 12 is a cross-sectional view showing the structure of the vicinity of an edge of a positive electrode plate covered with polyethylene resin in an electrode assembly according to another embodiment.

FIG. 12 is a cross-sectional view showing the structure of the vicinity of the second edge of the positive electrode plate in an electrode assembly assembled using the positive electrode plate as shown in FIG. 11. As shown in FIG. 12, between a positive electrode plate 43 comprising a positive electrode core material 41 and a positive electrode active material layer 42 formed on each surface of the core material and a negative electrode 44 is placed a separator 45 having a width wider than that of each of the electrodes. An exposed portion of the core material is provided at the second edge of the positive electrode core material 41. A porous metal layer 46 is attached to each surface of the exposed portion. The second edge of the positive electrode comprising the exposed portion of the core material and the porous metal layer is covered with a polyethylene resin film 47. The polyethylene resin film 47 functions to prevent an electric current from focusing on the porous metal layer because polyethylene resin is an insulating material. As a result, the degradation of the part of the separator contacting the porous metal layer is suppressed.

Of the exposed portions of core material, an electric current focuses particularly on the current collecting portion, and therefore it is effective to form a polyethylene resin film at the border area between the current collecting portion comprising an exposed portion of core material and the active material layer.

Figure 13:
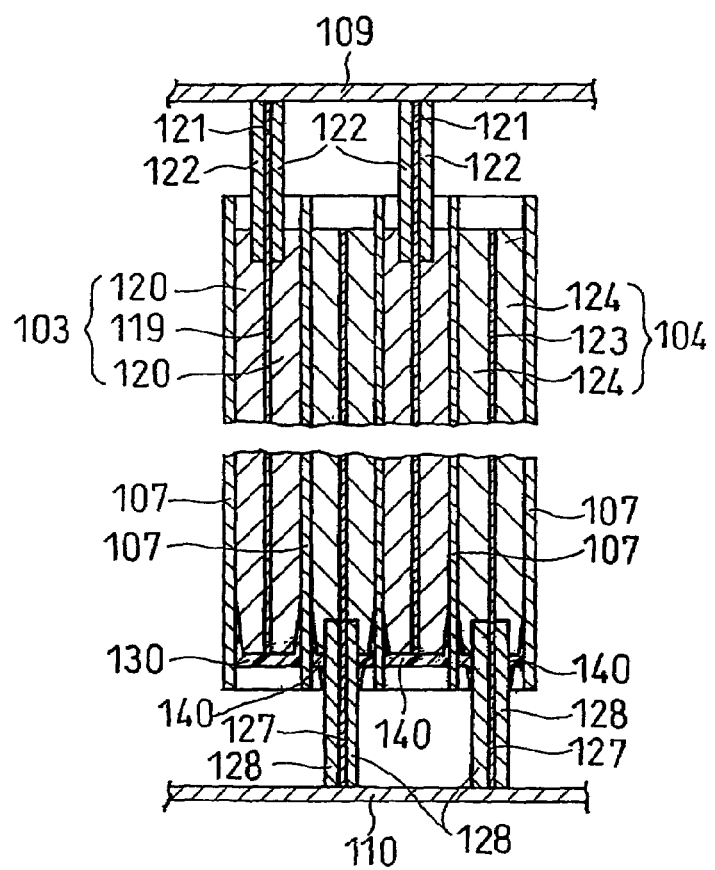
FIG. 13 is a cross-sectional view of a relevant part of an electrode assembly in which a polyethylene resin film is formed at the border area between a current collecting portion and an active material layer.
Figure 14:
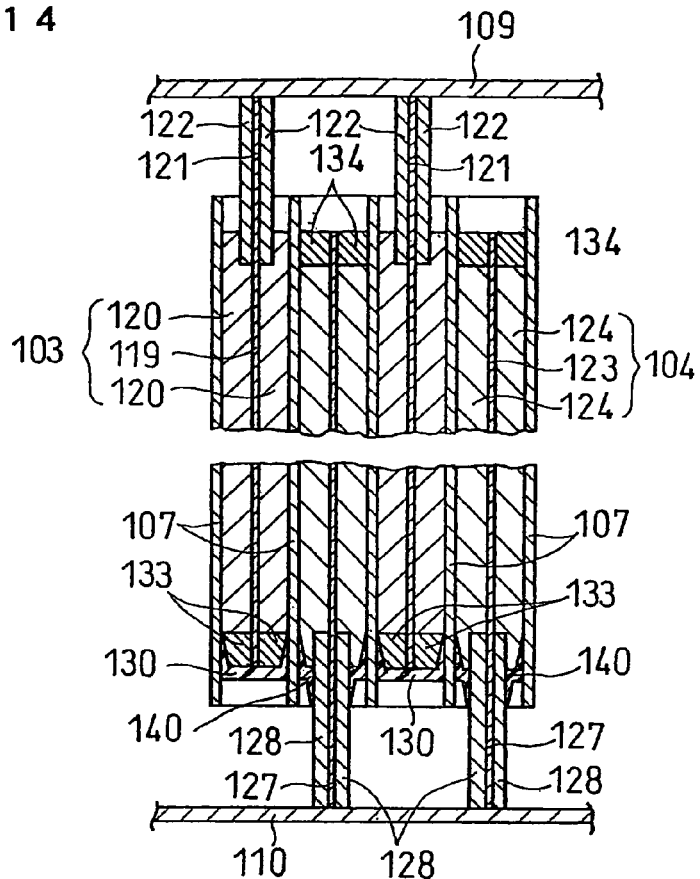
FIG. 14 is a cross-sectional view of a relevant part of an electrode assembly in which a polyethylene resin film is formed at the border area between a current collecting portion and an active material layer according to another embodiment.

FIGS. 13 and 14 show relevant parts of electrode assemblies wherein a polyethylene resin film is formed at the border area between a current collecting portion and an active material layer. The common elements in FIGS. 13 and 14 are indicated by the same reference signs. The reason a polyethylene resin film is formed only at one end face of the electrode assembly is to provide the path for electrolyte solution. It is to be understood that the location where the polyethylene resin film is formed is not limited to those shown in FIGS. 13 and 14.

On the top end face of the electrode assembly is disposed a positive electrode current collector plate 109, and on the bottom end face of the same is disposed a negative electrode current collector plate 110. The positive electrode current collector plate 109 is connected to the current collecting portion of a positive electrode plate 103 comprising a positive electrode core material 119 and a positive electrode active material layer 120 formed on each surface of the positive electrode core material. The current collecting portion of the positive electrode plate comprises an exposed portion of positive electrode core material 121 and a porous metal layer 122 attached to each surface of the exposed portion. On the other hand, the negative electrode current collector plate 110 is connected to the current collecting portion of a negative electrode plate 104 comprising a negative electrode core material 123 and a negative electrode active material layer 124 formed on each surface of the negative electrode core material. The current collecting portion of the negative electrode plate comprises an exposed portion of negative electrode core material 127 and a porous metal layer 128 attached to each surface of the exposed portion. Between the positive and negative electrode plates is placed a separator 107 having a width wider than that of each of the electrodes.

In FIG. 13, the second edge of the positive electrode plate does not have a porous metal layer formed thereon. Accordingly, the active material layer is exposed at the end face of the second edge. This end face and the peripheral sides thereof are covered with a polyethylene resin film 130. At the first edge of the negative electrode adjacent to the second edge of the positive electrode, a polyethylene resin film 140 is formed at the border area between the porous metal layer 128 and the negative electrode active material layer 124.

In FIG. 14, the second edge of the positive electrode plate has a porous metal layer 133 formed thereon, and the second edge of the negative electrode plate has a porous metal layer 134 formed thereon. Accordingly, the porous metal layer 133 is exposed at the end face of the second edge of the positive electrode plate. This end face and the peripheral sides thereof are covered with a polyethylene resin film 130. At the first edge of the negative electrode plate adjacent to the second edge of the positive electrode plate, a polyethylene resin film 140 is formed at the border area between the porous metal layer 128 and the negative electrode active material layer 124.

Figure 15:
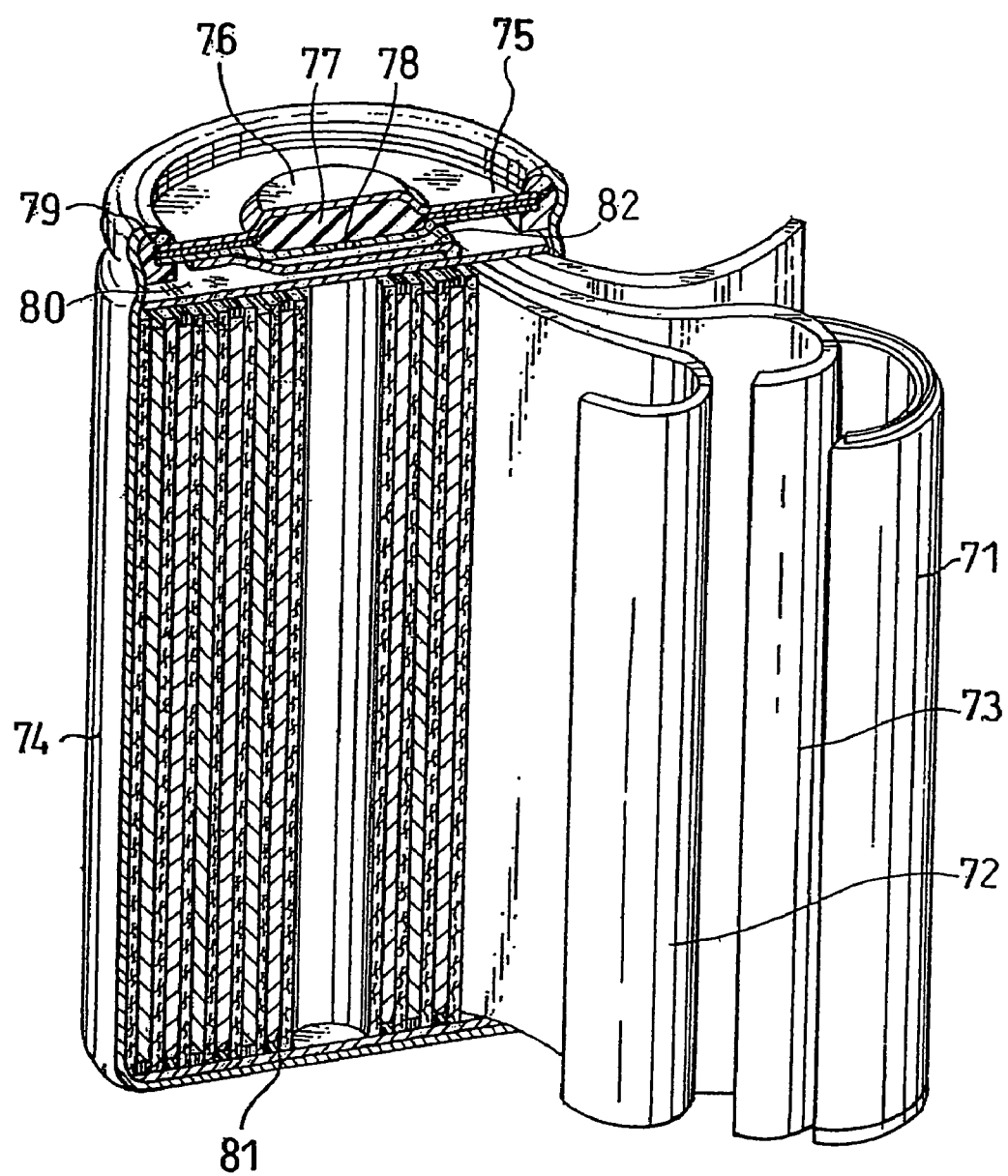
FIG. 15 is a vertical cross-sectional view of a cylindrical nickel metal-hydride storage battery of the present invention in a partially unfolded conformation.

FIG. 15 shows a vertical cross-sectional view of a cylindrical nickel hydride storage battery of the present invention in a partially unfolded conformation. In a case 74 of FIG. 15 are housed, with an electrolyte solution (not shown in the figure), an electrode assembly produced by spirally winding a positive electrode plate 71 and a negative electrode plate 72 with a separator 73 interposed therebetween. A sealing plate 75 is equipped with a positive electrode terminal 76 and a safety valve 77. The safety valve 77 comprises a rubber element for filling an aperture 78 penetrating between the inside and outside of the case 74. If a gas is generated in the battery to increase the internal pressure, the rubber element will be deformed and the gas will be released through the aperture between the inside and outside of the case. An insulting gasket 79 is arranged on the periphery of the sealing plate 75, and thus the positive electrode terminal 76 is insulated from the case 74 that also serves as the negative electrode terminal.

In FIG. 15, a positive electrode current collector plate 80 is welded to the upper end face of the electrode assembly. At the lower end face of the electrode assembly, on the other hand, the current collecting portion of the negative electrode plate is exposed in a spirally wound configuration, which is welded to a negative electrode current collector plate 81. The positive electrode current collector plate 80 is connected, through a lead 82, to the underside of the sealing plate electrically continuous to the positive electrode terminal. The negative electrode current collector plate 81, on the other hand, is in contact with the inner bottom face of the metal case. The negative electrode plate positioned at the outermost part of the electrode assembly is also in contact with the inner surface of the metal case. The contacts like the above allow the current collection to the negative electrode terminal.

In the alkaline storage battery as described above, the second edge of at least positive electrode is covered with polyethylene resin, and the film adheres to the separators disposed on both sides of the positive electrode plate. This prevents the extension of polyethylene resin as well as the positive electrode active material in the width direction of the positive electrode plate even when charge and discharge are repeated. Accordingly, micro short-circuiting is unlikely to occur even after the repetition of charge and discharge, and the reduction in capacity is also unlikely to occur even when the battery is stored in a fully charged state. Further, in an embodiment in which the second edge of an electrode plate comprises an exposed portion of electrode core material and a porous metal layer, the separation of the active material can be prevented by the porous metal layer, and the focusing of an electric current on the porous metal layer can be prevented by the polyethylene resin. In an embodiment in which the second edge of the negative electrode plate is covered with polyethylene resin, the separation of the active material from the negative electrode plate can also be prevented. In an embodiment in which the border area between the current collecting portion and the active material layer at the first edge of an electrode plate is covered with polyethylene resin, the focusing of an electric current on the current collecting portion can be prevented.

It is to be noted that FIGS. 2 to 15 are merely exemplary embodiments of the present invention and the present invention is applicable to any type of alkaline storage battery.

EXAMPLE 1

(i) Production of Core Material

A core material having strip-shaped first and second curved protrusions alternately protruding above and below the core material as shown in FIGS. 2 and 3 was produced. The core material was produced by, on a pure nickel foil (thickness: 20 μm, 170 g/m$^2$) obtained by electrolytic plating, forming slits perpendicular to the longitudinal direction thereof at a pitch of 0.5 mm and allowing the strips, each of which was positioned between a pair of the slits, to protrude alternately above and below the foil. A plain part where the curved protrusions were not formed was left on the edge that was along the longitudinal direction of the core material so that it would serve as a current collecting portion. On the plain part were formed a plurality of groove-shaped recesses in an undulatory pattern such that the plurality of grove-shaped recesses were parallel to each other. The core material processed in the above manner had an apparent thickness of 500 μm. Then, a paste mixture containing a carbonyl nickel powder (#255 manufactured by INCO Limited) and an aqueous solution of methyl cellulose (SM 400 manufactured by Shin-Etsu Chemical Co., Ltd.) at a carbonyl nickel powder rate of 50 g/m$^2$ was applied onto both surfaces of the processed core material, followed by drying and sintering. The core material having the carbonyl nickel powder carried thereon was sintered in a reducing atmosphere containing water vapor and a mixed gas of hydrogen and nitrogen at 950° C. for 15 minutes.

(ii) Production of Positive Electrode Plate

A positive electrode slurry was prepared by mixing 100 parts by weight of solid solution nickel hydroxide powder, 7 parts by weight of cobalt hydroxide fine powder, 21 parts by weight of an aqueous solution of carboxymethyl cellulose (CMC) at a CMC concentration of 1 wt % and 4 parts by weight of rubber latex (solid amount) (Aflas 150 manufactured by Asahi Glass Co., Ltd).

The above positive electrode slurry was applied onto the core material described above using a die coater, which was then dried with hot air at 100° C. for 2 minutes to form an active material layer. The core material carrying the active material layer thereon was then rolled using a roll press to have a thickness of 400 μm, which was cut into pieces of 375 mm length×35 mm width to give a positive electrode plate. On the plain part of the core material having a width of 1 mm which would serve as the current collecting portion of the positive electrode, the active material layer was not carried.

(iii) Application of Polyethylene Resin

A diluted dispersion of polyethylene resin was prepared by mixing an aqueous dispersion of polyethylene resin having a melting point of 100° C. (manufactured by Mitsui Chemicals, Inc., a solid content of 60 wt %) and an aqueous solution of methyl cellulose (SM 400 manufactured by Shin-Etsu Chemical Co., Ltd., a methyl cellulose concentration of 4 wt %) at a weight ratio of 1:4.

A vessel was filled with the diluted dispersion of polyethylene resin. A rotatable roller having a diameter of 300 mm was installed at the surface of the dispersion. Specifically, the roller was placed such that 75% of the cross section of the roller perpendicular to the rotation axis was positioned under the surface of the dispersion. The roller was then rotated to form a coating film of the diluted dispersion of polyethylene resin on the surface of the roller.

A positive electrode plate was placed perpendicular to the surface of the roller. The positive electrode plate was shifted toward the direction tangent to the roller surface while the edge opposite to the current collecting portion of the positive electrode plate was in contact with the film of the aqueous dispersion being formed on the roller surface. The shifting direction of the positive electrode plate and that of the roller surface were set to be the same, and the shifting speed of the positive electrode plate and that of the roller surface were also set to be the same, namely, 40 mm/sec. As a result, the diluted dispersion of polyethylene resin was uniformly applied onto the end face positioned opposite to the current collecting portion of the positive electrode plate as well as the peripheral sides of the end face.

The positive electrode having the diluted dispersion of polyethylene resin applied thereon was heated at a temperature of 110° C. for one minute so as to allow the polyethylene to adhere to the positive electrode plate. The polyethylene resin film formed on the end face of the positive electrode plate in the above manner had a thickness of 10 μm. The side portions of the positive electrode plate, each of which had a height of 0.5 mm from the end face, had the polyethylene resin film formed thereon.

(iv) Production of Negative Electrode Plate

An iron foil having a thickness of 60 μm whose surface was plated with nickel was used as the core material for negative electrode. A negative electrode slurry consisting mainly of a hydrogen storage alloy was applied onto both surfaces of the core material, which was dried, rolled and cut into pieces of a given size to give a negative electrode plate. At one edge parallel to the longitudinal direction of the negative electrode plate, the negative electrode core material was exposed to serve as the current collecting portion of the negative electrode.

(v) Production of Battery

The positive and negative electrodes were spirally wound with a hydrophilic-treated polypropylene separator interposed therebetween to give an electrode assembly. The current collecting portion of the positive electrode plate was exposed at one end face of the electrode assembly in a spirally wound configuration and the collecting portion of the negative electrode plate was exposed at the other end face of the same in the same configuration. The electrode assembly thus obtained was heated to 110° C. and held for one minute to allow the polyethylene resin covering the edge opposite to the current collecting portion of the positive electrode plate to adhere to the separator. Then, current collector plates comprising a steel plate plated with nickel were respectively welded to the current collecting portions exposed at the end faces of the electrode assembly. The electrode assembly having the current collector plates welded thereto was housed in an SC size case. An electrolyte solution prepared by dissolving 31 wt % of potassium hydroxide as the main solute in water was injected thereto. The case was sealed using a sealing plate to give a cylindrical nickel metal-hydride storage battery of Example 1 having a nominal capacity of 3300 mAh.

EXAMPLE 2

(i) Production of Core Material

A core material having strip-shaped first and second curved protrusions alternately protruding above and below the core material as shown in FIGS. 2 and 3 was produced. The core material was produced by, on a pure nickel foil (thickness: 20 μm, 170 g/m$^2$) obtained by electrolytic plating, forming slits perpendicular to the longitudinal direction thereof at a pitch of 0.5 mm and allowing the strips, each of which was positioned between a pair of the slits, to protrude alternately above and below the foil. A plain part where the curved protrusions were not formed was left on each of the edges that were along the longitudinal direction of the core material so that they would serve as the current collecting portion and the second edge, respectively. On each of the plain parts were formed a plurality of groove-shaped recesses in an undulatory pattern such that the plurality of grove-shaped recesses were parallel to each other. The core material processed in the above manner had an apparent thickness of 500 μm. Then, a paste mixture containing a carbonyl nickel powder (#255 manufactured by INCO Limited) and an aqueous solution of methyl cellulose (SM 400 manufactured by Shin-Etsu Chemical Co., Ltd.) was applied onto both surfaces of the processed core material at a carbonyl nickel powder rate of 50 g/m$^2$, followed by drying.

Further, the paste mixture containing a carbonyl nickel powder (#255 manufactured by INCO Limited) and an aqueous solution of methyl cellulose (SM 400 manufactured by Shin-Etsu Chemical Co., Ltd.) was applied onto the area having a width of 1.0 mm which would serve as the second edge of the positive electrode core material by a dispenser to have a sintered thickness (a thickness including the nickel foil) of 400 μm, followed by drying. Subsequently, the core material having the carbonyl nickel powder carried thereon was sintered in a reducing atmosphere containing water vapor and a mixed gas of hydrogen and nitrogen at 950° C. for 15 minutes.

(ii) Production of Positive Electrode Plate

A positive electrode slurry was prepared by mixing 100 parts by weight of solid solution nickel hydroxide powder, 7 parts by weight of cobalt hydroxide fine powder, 21 parts by weight of an aqueous solution of carboxymethyl cellulose (CMC) at a CMC concentration of 1 wt % and 4 parts by weight of rubber latex (solid amount) (Aflas 150 manufactured by Asahi Glass Co., Ltd).

The above positive electrode slurry was applied onto the core material described above using a die coater, which was then dried with hot air at 100° C. for 2 minutes to form an active material layer. The core material having the active material layer carried thereon was then rolled using a roll press to have a thickness of 400 μm, which was cut into pieces of 375 mm length×35 mm width to give a positive electrode plate. On the plain part of the core material having a width of 1 mm which would serve as the current collecting portion of the positive electrode as well as on the plain part having a width of 1 mm which would serve as the second edge, the active material layer was not carried.

(iii) Application of Polyethylene Resin

A diluted dispersion of polyethylene resin was prepared by mixing an aqueous dispersion of polyethylene resin having a melting point of 100° C. (manufactured by Mitsui Chemicals, Inc., a solid content of 60 wt %) and an aqueous solution of methyl cellulose (SM 400 manufactured by Shin-Etsu Chemical Co., Ltd., a methyl cellulose concentration of 4 wt %) at a weight ratio of 1:4.

A vessel was filled with the diluted dispersion of polyethylene resin. A rotatable roller having a diameter of 300 mm was installed at the surface of the dispersion. Specifically, the roller was placed such that 75% of the cross section of the roller perpendicular to the rotation axis was positioned under the surface of the dispersion. The roller was then rotated to form a coating film of the diluted dispersion of polyethylene resin on the surface of the roller.

A positive electrode plate was placed perpendicular to the surface of the roller. The positive electrode plate was shifted toward the direction tangent to the roller surface while the second edge opposite to the current collecting portion of the positive electrode plate was in contact with the film of the aqueous dispersion being formed on the roller surface. The shifting direction of the positive electrode plate and that of the roller surface were set to be the same, and the shifting speed of the positive electrode plate and that of the roller surface were also set to be the same, namely, 60 mm/sec. As a result, the diluted dispersion of polyethylene resin was uniformly applied onto the end face positioned opposite to the current collecting portion of the positive electrode plate where the porous metal layer was exposed, as well as the peripheral sides of the end face.

The positive electrode having the diluted dispersion of polyethylene resin applied thereon was heated at a temperature of 110° C. for one minute so as to allow the polyethylene to adhere to the positive electrode plate. The polyethylene resin film formed on the end face of the positive electrode plate in the above manner had a thickness of 10 μm. The side portions of the positive electrode plate, each of which had a height of 1.2 mm from the end face, had the polyethylene resin film formed thereon.

(iv) Production of Negative Electrode Plate

An iron foil having a thickness of 60 μm whose surface was plated with nickel was used as the core material for negative electrode. A negative electrode slurry consisting mainly of a hydrogen storage alloy was applied onto both surfaces of the core material, which was dried, rolled and cut into pieces of a given size to give a negative electrode plate. At one edge parallel to the longitudinal direction of the negative electrode plate, the negative electrode core material was exposed to serve as the current collecting portion of the negative electrode.

(v) Production of Battery

The positive and negative electrodes were spirally wound with a hydrophilic-treated polypropylene separator interposed therebetween to give an electrode assembly. The current collecting portion of the positive electrode plate was exposed at one end face of the electrode assembly in a spirally wound configuration and the collecting portion of the negative electrode plate was exposed at the other end face of the same in the same configuration. The electrode assembly thus obtained was heated to 110° C. and held for one minute to allow the polyethylene resin covering the edge opposite to the current collecting portion of the positive electrode plate to adhere to the separator. Then, current collector plates comprising a steel plate plated with nickel were respectively welded to the current collecting portions exposed at the end faces of the electrode assembly. The electrode assembly having the current collector plates welded thereto was housed in an SC size case. An electrolyte solution prepared by dissolving 31 wt % of potassium hydroxide as the main solute in water was injected thereto. The case was sealed using a sealing plate to give a cylindrical nickel metal-hydride storage battery of Example 1(sic) having a nominal capacity of 3300 mAh.

Comparative Example 1

A battery of Comparative Example 1 was produced in the same manner as in Example 1 except that the edge positioned opposite to the current collecting portion of the positive electrode was not covered with polyethylene resin.

Comparative Example 2

A battery of Comparative Example 2 was produced in the same manner as in Example 1 except that the step of allowing the polyethylene resin covering the edge positioned opposite to the current collecting portion of the positive electrode plate to adhere to the separator was not performed after the production of the electrode assembly.

Comparative Example 3

A battery of Comparative Example 3 was produced in the same manner as in Example 2 except that the edge positioned opposite to the current collecting portion of the positive electrode was not covered with polyethylene resin.

[Battery Evaluation]

Each of the batteries of Examples and Comparative Examples produced above was put through two initial charge and discharge cycles where the battery was charged at a charging rate of 0.1 C for 15 hours and discharged at a discharging rate of 0.2 C for 4 hours, after which an aging for acceleration of the activation of the negative electrode alloy was performed at 45° C. for 3 days.

Subsequently, normal charge and discharge cycles were repeatedly performed. In the normal charge and discharge cycles, charging was performed at a charging rate of 1 C using a dT/dt (dT=1.5° C., dt=30 seconds) control method, and discharging was subsequently performed at a discharge current of 10 A until the battery voltage reached 0.8 V.

At every 50th cycle, the battery was charged at a charging rate of 1 C up to 120% of the nominal capacity (that is, for 72 minutes), which was then allowed to stand for one hour and discharged at a discharging rate of 1 C until the battery voltage reached 1.0 V. The capacity obtained at this time is referred to as "C-1 hr".

The battery was again charged at a charging rate of 1 C up to 120% of the nominal capacity, which was then allowed to stand for 72 hours and discharged at a discharging rate of 1 C until the battery voltage reached 1.0 V. The capacity obtained at this time is referred to as "C-72 hr".

The rate of C-72 hr to C-1 hr (C-72 hr/C-1 hr) was calculated in percentage. This value is hereinafter referred to as "capacity retention rate after standing". The correlation between the capacity retention rate after standing and the number of charge and discharge cycles is shown in FIG. 16.

Figure 16:
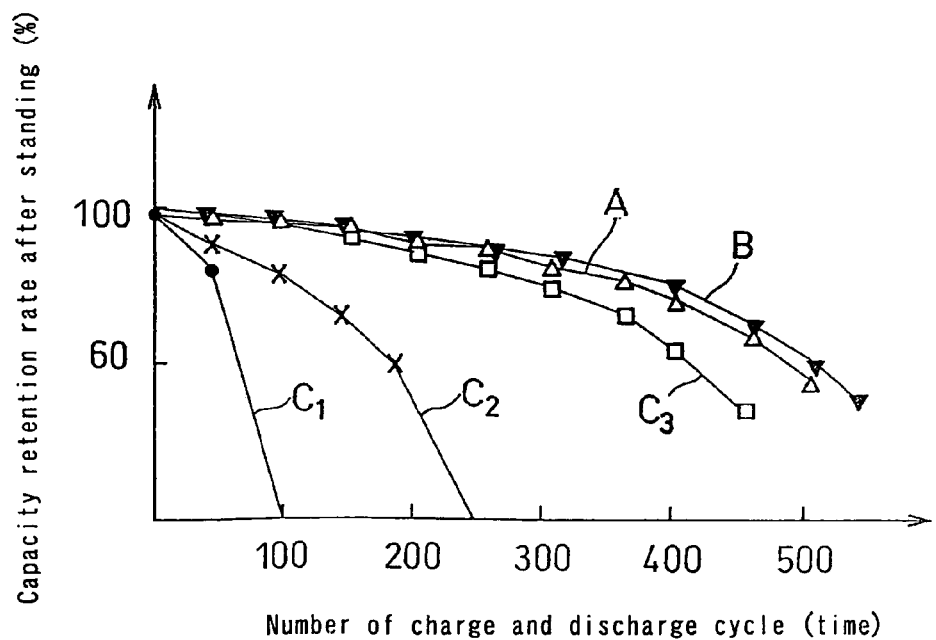
FIG. 16 is a graph showing the correlation between the capacity retention rate after standing and the number of charge and discharge cycles of batteries of Examples and Comparative Examples.

In FIG. 16, the capacity retention rate after standing of the battery of Comparative Example 1 ($C_1$) and that of the battery of Comparative Example 2 ($C_2$) were 60% or less after 80 to 200 cycles. On the other hand, the capacity retention rate after standing of the battery of Example 1 (A) was 60% or more even after 450 cycles. Moreover, that of the battery of Example 2 (B) was 60% or more even after 650 cycles.

The reason that such difference occurred is due to the expansion of the electrode plate during repetition of charge and discharge. Presumably, the positive electrode active material extended in the width direction of the electrode plate in the battery of Comparative Example 1, and the resin film extended in the width direction of the electrode plate along with the positive electrode active material in the battery of Comparative Example 2. As a result, it was likely that the positive electrode active material caused short-circuiting between the positive electrode plate and the negative electrode plate positioned opposite to each other in the batteries of Comparative Examples 1 and 2.

The capacity retention rate after standing of the battery of Comparative Example 3 ($C_3$) decreased largely at the 450th cycle. In the battery of Comparative Example 3, the second edge of the positive electrode plate was protected by the rigid porous metal layer, and therefore it is presumed that the positive electrode active material did not extend in the thickness direction and did not separate from the electrode plate even when the electrode plate expanded. The porous metal layer of the positive electrode plate, on the other hand, was positioned opposite to the negative electrode plate with the separator interposed therebetween, and therefore the electric current was likely to focus on the porous metal layer. Accordingly, it is presumed that the degradation of the part of the separator contacting the porous metal layer was accelerated by the repetition of charge and discharge cycles.

In the case of the battery of Example 2, the surface of the porous metal layer was covered with the polyethylene resin film which was the insulating material, and therefore the current path to the porous metal layer was interrupted. Accordingly, the electric current did not focus on the porous metal layer, and the degradation of the part of the separator contacting the porous metal layer was prevented even when the charge and discharge cycles were repeated, leading to the improvement of the capacity retention rate after standing.

INDUSTRIAL APPLICABILITY

According to the present invention, it is possible to effectively prevent the short-circuiting between the positive electrode active material and the negative electrode plate and the separation of the active material by a simple and easy method. Thus, the present invention can provide a high performance alkaline storage battery at low cost.

The invention claimed is:

1. An alkaline storage battery comprising:
a positive electrode plate having a first edge and a second edge opposite thereto;
a negative electrode plate having a first edge and a second edge opposite thereto;
separators interposed between said positive electrode plate and said negative electrode plate; and
an alkaline electrolyte, wherein:
the first edge of said positive electrode plate and the first edge of said negative electrode plate serve as current collecting portions,
at least the second edge of at least said positive electrode plate is covered with polyethylene resin on an end face and peripheral sides thereof,
said polyethylene resin forming a film on said second edge of said positive electrode plate adheres to said separators positioned on both sides of said positive electrode plate,
at least one of said positive electrode plate and said negative electrode plate comprises an electrode core material and an active material layer carried on said electrode core material, and
said second edge covered with said polyethylene resin comprises an exposed portion of said electrode core material not having said active material layer thereon.

2. The alkaline storage battery in accordance with claim 1, wherein at least said second edge of at least said negative electrode plate is covered with polyethylene resin on an end face and peripheral sides thereof.

3. The alkaline storage battery in accordance with claim 1, wherein said polyethylene resin has a melting point of not higher than 120° C.

4. The alkaline storage battery in accordance with claim 1, wherein said polyethylene resin film has a thickness of 5 to 50 μm on said end face.

5. The alkaline storage battery in accordance with claim 1, wherein a porous metal layer is attached onto said exposed portion of said electrode core material at said second edge.

6. The alkaline storage battery in accordance with claim 5, wherein the thickness of said second edge comprising said exposed portion of said electrode core material and said porous metal layer is 50 to 100% of that of the electrode plate comprising said electrode core material and said active material layer.

7. The alkaline storage battery in accordance with claim 1, wherein the current collecting portion of at least one of said positive electrode plate and said negative electrode plate comprises an exposed portion of said electrode core material not having said active material layer thereon, and at least a border area between said current collecting portion and said active material layer is covered with polyethylene resin.

8. The alkaline storage battery in accordance with claim 7, wherein a second porous metal layer is attached to said exposed portion of said electrode core material of the current collecting portion, and a part of said second porous metal layer is covered by an edge of said active material layer adjacent to said exposed portion.

9. The alkaline storage battery in accordance with claim 1, wherein said electrode core material is made of a metal foil or metal sheet subjected to a lath process or punching process, said metal foil or metal sheet has slits formed in a matrix arrangement, and strips, each of which is positioned between a pair of the slits, are alternately protruded above and below the electrode core material along one direction to form first and second curved protrusions.

* * * * *